US010195999B1

(12) United States Patent
Glickman et al.

(10) Patent No.: US 10,195,999 B1
(45) Date of Patent: Feb. 5, 2019

(54) VEHICLE COMPARTMENT SYSTEMS

(71) Applicant: FORD GLOBAL TECHNOLOGIES, LLC, Dearborn, MI (US)

(72) Inventors: David Brian Glickman, Southfield, MI (US); Michael Williams, Northville, MI (US); Colin Christopher Nitroy, Dearborn, MI (US); Kosta Papanikolaou, Huntington Woods, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/667,077

(22) Filed: Aug. 2, 2017

(51) Int. Cl.
*B60R 5/02* (2006.01)
*B62D 25/12* (2006.01)

(52) U.S. Cl.
CPC .............. *B60R 5/02* (2013.01); *B62D 25/12* (2013.01)

(58) Field of Classification Search
CPC ................ B60R 5/00; B60R 5/02; B60R 5/04
USPC ........... 180/69.21, 69.22; 224/488, 328, 403, 224/404, 423; 293/106; 296/37.2, 37.3, 296/100.12, 98, 193.04, 193.09
See application file for complete search history.

(56) References Cited

U.S. PATENT DOCUMENTS

| | | | | |
|---|---|---|---|---|
| 2,837,372 A * | 6/1958 | Odom | ................. | B62D 25/105 296/76 |
| 4,923,246 A * | 5/1990 | Takahashi | ................ | B60J 7/05 296/221 |
| 4,932,704 A * | 6/1990 | Ament | .................... | B60R 5/048 160/84.04 |
| 5,364,142 A * | 11/1994 | Coiner | ................... | B60R 19/48 293/106 |
| 5,409,288 A * | 4/1995 | Masuda | ................. | B60K 11/04 293/155 |
| 6,142,549 A * | 11/2000 | Clare | ...................... | B60R 11/06 224/404 |
| 6,247,741 B1 * | 6/2001 | Seel | ......................... | B60R 5/00 296/37.14 |
| 6,598,914 B1 * | 7/2003 | Dixon | .................... | B60K 11/04 293/106 |
| 6,883,852 B2 * | 4/2005 | Laskey | .................. | B60N 3/102 220/350 |
| 7,401,716 B2 * | 7/2008 | Svenson | ................. | B60R 5/045 224/42.32 |
| 7,488,024 B1 * | 2/2009 | Medlar | .................... | B60R 5/04 296/37.14 |
| 8,292,345 B2 * | 10/2012 | Voyer | ...................... | B60J 5/104 296/106 |

(Continued)

FOREIGN PATENT DOCUMENTS

| | | |
|---|---|---|
| CN | 205326759 U | 6/2016 |
| DE | 10157709 A1 | 6/2003 |

(Continued)

*Primary Examiner* — Dennis H Pedder
(74) *Attorney, Agent, or Firm* — Carlson, Gaskey & Olds

(57) ABSTRACT

A vehicle compartment system includes a tub establishing a storage compartment and a closure panel movable between a closed position and an open position for accessing the storage compartment. The closure panel is maintained below a vehicle down vision line in the open position. The closure panel may be raised from the closed position to a position above the storage compartment and then may be automatically slid rearward to the open position.

18 Claims, 5 Drawing Sheets

(56) References Cited

U.S. PATENT DOCUMENTS

| | | | | |
|---|---|---|---|---|
| 8,388,047 B2 * | 3/2013 | Schmidt | ............... | B62D 25/087 296/193.09 |
| 8,602,467 B2 * | 12/2013 | Lee | ......................... | B60R 19/48 293/106 |
| 8,777,299 B2 * | 7/2014 | Langford, Jr. | ......... | B62D 25/10 180/69.2 |
| 2004/0051339 A1 * | 3/2004 | Gaillard | .................... | B60J 7/067 296/98 |
| 2004/0130174 A1 * | 7/2004 | Laskey | ................. | B60N 3/102 296/37.1 |
| 2004/0160076 A1 * | 8/2004 | Masuda | .................... | B60R 5/04 296/37.3 |
| 2007/0181623 A1 * | 8/2007 | Schneider | ................. | B60R 5/00 224/401 |
| 2010/0320793 A1 * | 12/2010 | Aebker | .................... | B60R 5/04 296/37.13 |
| 2011/0031771 A1 | 2/2011 | Ding | | |
| 2017/0144717 A1 * | 5/2017 | Bellis | .................... | B62D 65/024 |
| 2018/0065672 A1 * | 3/2018 | Maier | ................. | B62D 21/152 |

FOREIGN PATENT DOCUMENTS

| | | |
|---|---|---|
| FR | 2899177 A1 | 10/2007 |
| FR | 2943028 A1 | 9/2010 |

* cited by examiner

VEHICLE COMPARTMENT SYSTEMS

TECHNICAL FIELD

This disclosure relates to vehicle compartment systems that include movable closure panels that can be automatically moved to uncover a storage compartment.

BACKGROUND

Vehicles include various compartments that are accessible from outside the vehicle, such as an engine compartment or trunk compartment, for example. In electrified vehicles, an additional area normally occupied by an internal combustion engine may be available for added cargo space under a hood or other closure panel. It is important to be able to latch and unlatch such a closure panel. Existing latching systems for latching and unlatching closure panels often add additional expense and unnecessary weight to the vehicle.

SUMMARY

A vehicle compartment system according to an exemplary aspect of the present disclosure includes, among other things, a tub establishing a storage compartment and a closure panel movable between a closed position and an open position for accessing the storage compartment. The closure panel is maintained below a vehicle down vision line in the open position.

In a further non-limiting embodiment of the foregoing vehicle compartment system, the system includes an actuating assembly for moving the closure panel between the closed position and the open position.

In a further non-limiting embodiment of either of the foregoing vehicle compartment systems, the actuating assembly includes a strut and a linkage assembly that guide movement of the closure panel after unlatching the closure panel relative to the tub.

In a further non-limiting embodiment of any of the foregoing vehicle compartment systems, the storage compartment includes a cargo area and a rear shelf.

In a further non-limiting embodiment of any of the foregoing vehicle compartment systems, the rear shelf is at least partially covered by the closure panel when the closure panel is in the open position.

In a further non-limiting embodiment of any of the foregoing vehicle compartment systems, the system includes a handle for moving the closure panel from the open position back to the closed position.

In a further non-limiting embodiment of any of the foregoing vehicle compartment systems, the system includes a shelving assembly attachable to the tub.

In a further non-limiting embodiment of any of the foregoing vehicle compartment systems, the shelving assembly includes a shelf and a bracket assembly for securing the shelf to the tub.

In a further non-limiting embodiment of any of the foregoing vehicle compartment systems, the tub includes a first access panel for accessing a battery.

In a further non-limiting embodiment of any of the foregoing vehicle compartment systems, the tub includes a second access panel for accessing a battery terminal.

In a further non-limiting embodiment of any of the foregoing vehicle compartment systems, the system is part of a vehicle.

In a further non-limiting embodiment of any of the foregoing vehicle compartment systems, the vehicle compartment system is part of a front end module of the vehicle.

In a further non-limiting embodiment of any of the foregoing vehicle compartment systems, the vehicle compartment system is supported by a support beam.

In a further non-limiting embodiment of any of the foregoing vehicle systems, a front lip of the tub is received over the support beam to support the tub relative to a front end module of the vehicle.

In a further non-limiting embodiment of any of the foregoing vehicle compartment systems, the support beam further supports a cooling pack of the vehicle.

A method according to an exemplary aspect of the present disclosure includes, raising a closure panel of a vehicle compartment system from a first position to a second position above a storage compartment, and automatically sliding the closure panel from the second position to a third position rearward of the second position. The closure panel is below a vehicle down vision line in the third position.

In a further non-limiting embodiment of the foregoing method, the method includes unlatching the closure panel relative to a tub of the vehicle compartment system prior to raising the closure panel.

In a further non-limiting embodiment of either of the foregoing methods, raising the closure panel includes actuating a strut of an actuating assembly.

In a further non-limiting embodiment of any of the foregoing methods, automatically sliding the closure panel includes manipulating a strut and a linkage assembly of the vehicle compartment assembly.

In a further non-limiting embodiment of any of the foregoing methods, after automatically sliding the closure panel to the third position, the method includes opening or removing an access panel of the vehicle compartment system to service a battery.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle compartment systems that are accessible from outside the vehicle. An exemplary vehicle compartment system includes a tub establishing a storage compartment and a closure panel for covering the storage compartment. In some embodiments, the closure panel may be raised above the storage compartment and then automatically slid rearward to uncover the storage compartment. In the open position, the closure panel is below a down vision line of the vehicle. In other embodiments, the vehicle compartment system may include features such as battery access panels, a handle, and/or a shelving system. These and other features of this disclosure are described in greater detail below.

Figure 1:
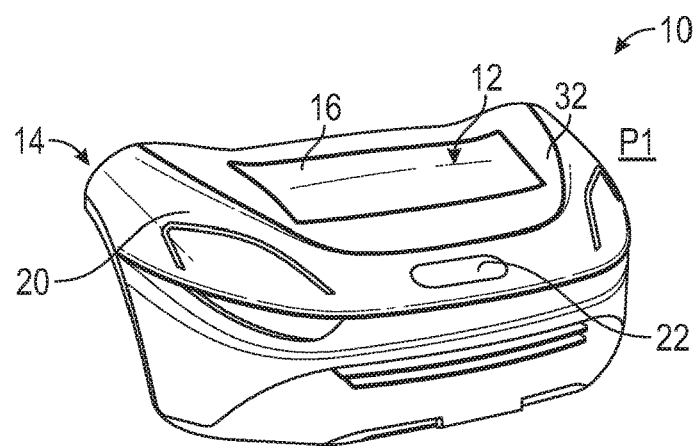
FIG. 1 illustrates a vehicle equipped with a compartment system. A closure panel of the compartment system is illustrated in a closed position.
Figure 2:
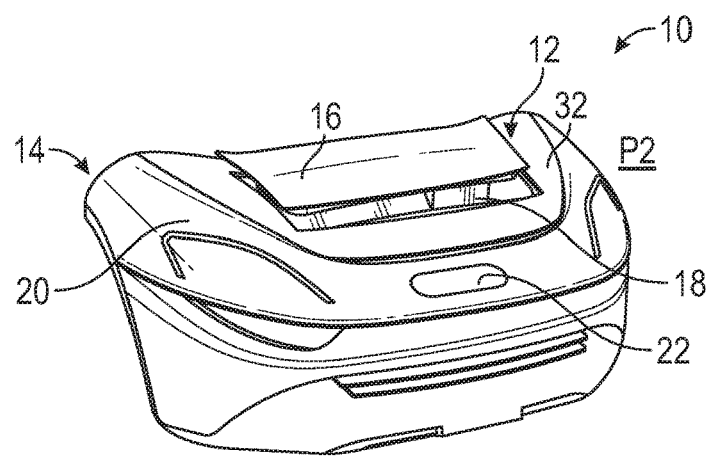
FIG. 2 illustrates an unlatched position of the closure panel of the compartment system of FIG. 1.
Figure 3:
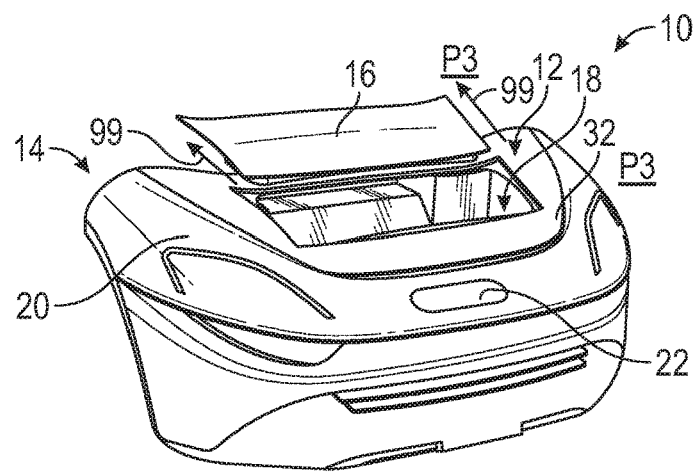
FIG. 3 illustrates an open position of the closure panel of the compartment system of FIG. 1.

FIGS. 1-3 schematically illustrate portions of a vehicle 10. The vehicle 10 may be a car, a truck, a van, a sport utility vehicle, or any other type of vehicle. The vehicle 10 could also be a conventional engine powered motor vehicle or a battery powered hybrid or electric vehicle.

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a compartment system 12 that is accessible from outside the vehicle 10 (i.e., from outside the passenger compartment of the vehicle 10). In an embodiment, the compartment system 12 is incorporated as part of a front end module 14 of the vehicle 10 and may therefore be referred to as a "front compartment system." Such a configuration may be particularly useful for battery electric vehicles or rear mounted engine vehicles which typically include an area normally occupied by a vehicle engine available for added cargo space within the front end module 14. However, the compartment system 12 could be located at other exterior locations of the vehicle 10, including but not limited to at a rear end module of the vehicle 10 for establishing a trunk space.

The compartment system 12 includes a closure panel 16 movable to provide access to a storage compartment 18 (see FIGS. 2 and 3). The closure panel 16 could be either a polymeric component or a metallic component.

FIG. 1 illustrates a first position P1 (e.g., a closed position) of the closure panel 16. The closure panel 16 is closed and securely latched in the first position P1. When the closure panel 16 is in the first position P1, the closure panel 16 is flush with a remaining portion of a vehicle exterior component 20 that surrounds the compartment system 12. In an embodiment, the vehicle exterior component 20 is a hood.

Any type of latch can be used to latch the closure panel 16 to the vehicle 10. In an embodiment, a manual release located wither within or at an exterior of the vehicle 10 is activated by a user to unlatch the closure panel 16. In another embodiment, a vehicle emblem 22 mounted to the vehicle exterior component 20 is pushed to unlatch the closure panel 16 or is moved to gain key-access for unlatching the closure panel 16. In yet another embodiment, the closure panel 16 is unlatched electronically, such as by actuating a key fob or a button inside the vehicle 10.

FIG. 2 illustrates a second position P2 (e.g., unlatched position) of the closure panel 16. As shown in FIG. 2, the closure panel 16 may automatically rise slightly above the vehicle exterior component 20, and thus above the storage compartment 18, when the closure panel 16 is unlatched.

FIG. 3 illustrates a third position P3 of the closure panel 16. In the third position P3, the closure panel 16 is opened for accessing the storage compartment 18. After being unlatched and raised above the vehicle exterior component 20, the closure panel 16 may automatically slide rearwardly (e.g., in a direction 99 away from the vehicle emblem 22) toward the third position P3. Any type of mechanism may be used to automatically slide the closure panel 16 to the third position P3. An exemplary actuating assembly is discussed in greater detail below with reference to FIG. 6.

Figure 10:
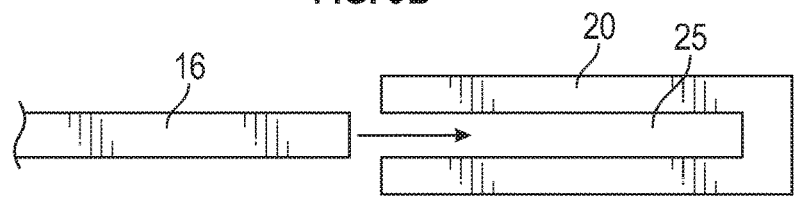
FIG. 10 schematically illustrates moving a closure panel of a vehicle compartment system into a pocket of a vehicle exterior component.

In an embodiment, the closure panel 16 slides above an outer surface of the vehicle exterior component 20 as it moves toward the third position P3. In another embodiment, the closure panel 16 may slide within a pocket 25 inside the vehicle exterior component 20 and/or the compartment system 12 as it moves toward the third position P3 (see, e.g., FIG. 10).

Figure 4:
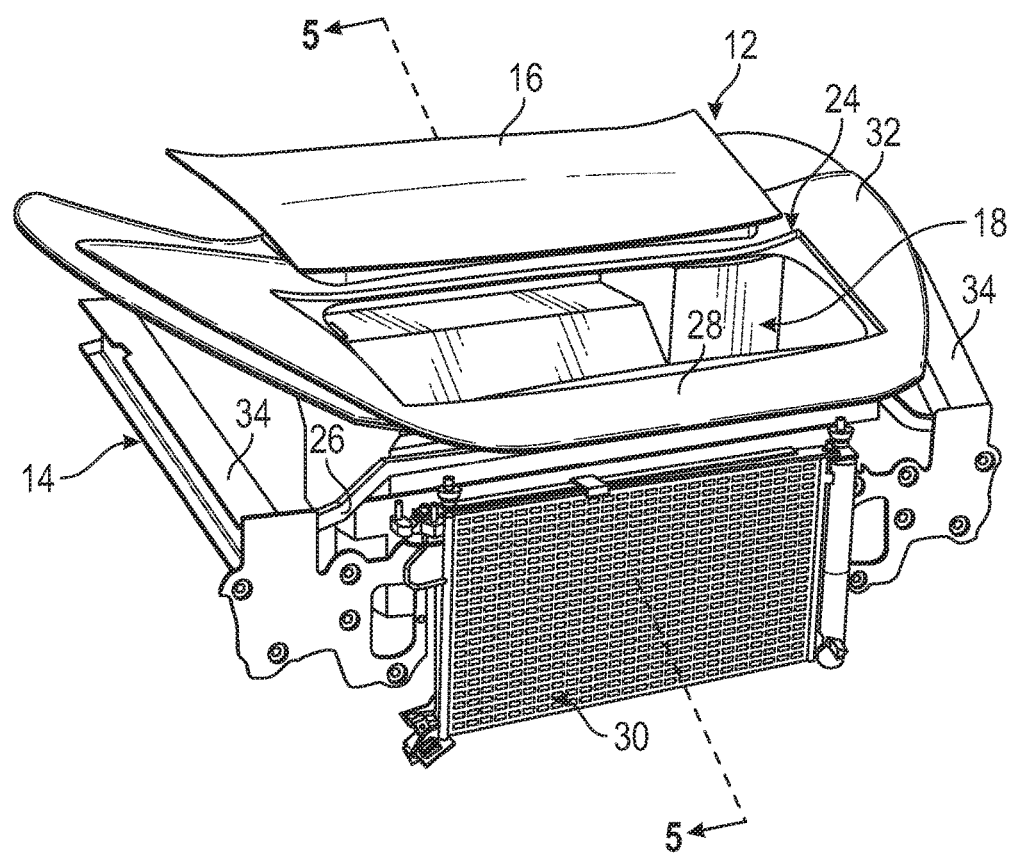
FIG. 4 illustrates an exemplary vehicle compartment system.

Referring to FIG. 4, the compartment system 12 includes a tub 24 that establishes the storage compartment 18. In an embodiment, the tub 24 is constructed of a polymeric material. However, other materials, including metallic materials, are also contemplated as within the scope of this disclosure.

The tub 24 may be supported by a support beam 26 of the front end module 14. The support beam 26 may be fixedly secured to other support structures 34 of the front end module 14. In an embodiment, a front lip 28 of the tub 24 is received over the support beam 26 to support the tub 24 relative to the front end module 14. Although not shown, a rear of the tub 24 may be supported by a rear support beam of the front end module 14. Once mounted relative to the front end module 14, an upper exterior surface 32 of the tub 24 is substantially flush with the vehicle exterior component 20 (see, e.g., FIGS. 1-3).

In another embodiment, the support beam 26 doubles as an attachment rail for securing a cooling pack 30 to the front end module 14. The support beam 26 may also be used to attach various other vehicle structures, such as vehicle lighting assemblies, fascia, etc.

Figure 5:
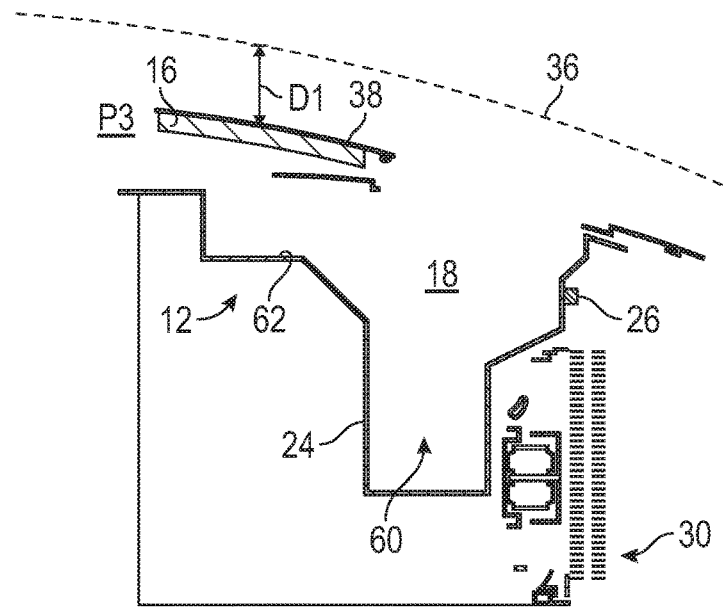
FIG. 5 is a cross-sectional view of the vehicle compartment system of FIG. 4 illustrating a closure panel of the vehicle compartment system in an open position.

FIG. 5 is a cross-sectional view of the compartment system 12 and depicts the closure panel 16 in the third position P3 (i.e., the open position). The closure panel 16 is positioned below a down vision line 36 of the vehicle 10 even when moved to the third position P3. The down vision line 36 represents the primary axis through which a driver of the vehicle 10 views the forward surroundings of the vehicle 10 when seated in a front seat of the vehicle passenger cabin. The down vision line 36 defines driver forward visibility through an unobstructed opening from the driver's eye in the passenger cabin of the vehicle through the windshield and a point on the hood or fender which acts as the primary obstruction (whether that be the front of the hood, the top of the grille, or even an aggressive hood dome or scoop. In an embodiment, the driver's eye position is assumed to be approximately 95% of possible driver height/seat position combinations at worst case. In view of the foregoing, the down vision line 36 is dependent on multiple factors and therefore may vary from vehicle to vehicle.

In an embodiment, an upper surface 38 of the closure panel 16 may be positioned a distance D1 below the down vision line 36 when the closure panel 16 is in the third position P3. Because it is kept below the down vision line 36, the closure panel 16 will not interfere with the vision of the vehicle driver even if unintentionally opened.

Figure 6:
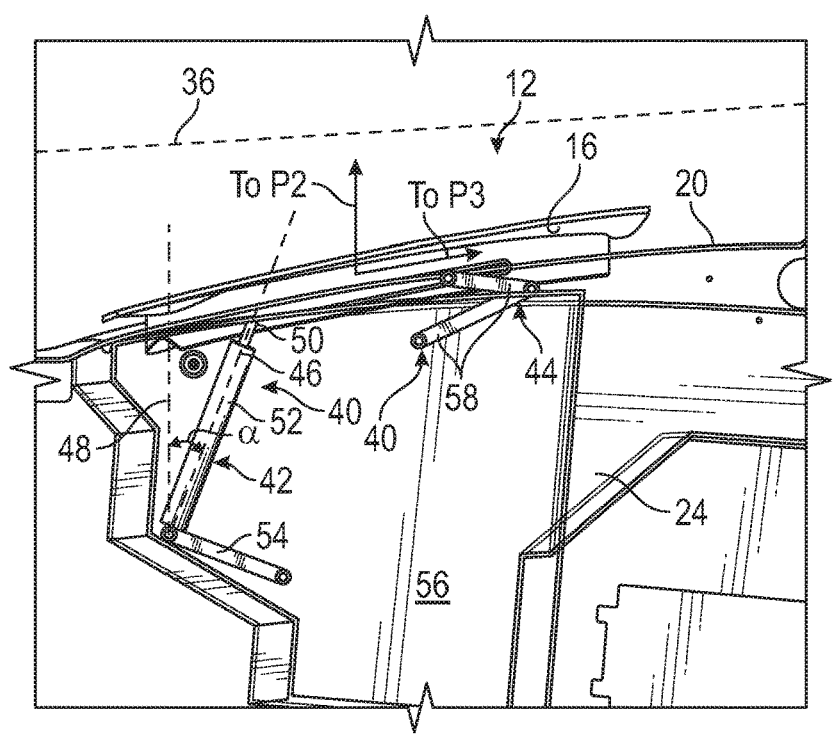
FIG. 6 illustrates an actuating assembly for moving the closure panel of the vehicle compartment system of FIGS. 4 and 5.

An actuating assembly 40 for automatically moving the closure panel 16 of the compartment system 12 to the second position P2 and the third position P3 once unlatched is illustrated in FIG. 6. It should be understood that movement to the second position P2 and the third position P3 can occur either sequentially or at least partially simultaneously.

In an embodiment, the actuating assembly 40 is a mechanical system that includes a strut 42 and at least one linkage assembly 44. The actuating assembly 40 could include various other designs and configurations within the scope of this disclosure. The strut 42 and the linkage assembly 44 may be mounted to the closure panel 16 to guide movement of the closure panel 16 between the first, second, and third positions P1, P2, and P3. In an embodiment, the strut 42 is mounted near a front portion of the closure panel 16 and the linkage assembly 44 is mounted near a rear portion of the closure panel 16.

The strut 42 may be positioned to extend along an axis 46 that is transverse to a vertical axis 48 of the vehicle 10. The vertical axis 48 is generally perpendicular to the ground. The axis 46 may extend at any angle α relative to the vertical axis 48. In an embodiment, the angle α is between about 1° and about 90° relative to the vertical axis 48. In general, the axis 46 is non-parallel to the vertical axis 48 to ensure that the closure panel 16 is able to move toward the third position P3 to uncover the storage compartment 18.

Tension is released on the strut 42 once the closure panel 16 is unlatched, thus allowing a strut rod 50 of the strut 42 to move outwardly from a strut housing 52. The closure panel 16 is moved to the second position P2 as the strut rod 50 moves outwardly. The closure panel 16 can automatically slide to the third position P3 once the closure panel 16 has been raised high enough above the vehicle exterior component 20.

In an embodiment, the strut housing 52 is pivotally connected to a linkage 54 for guiding movement of the closure panel 16 toward the third position P3. The linkage 54 may be mounted to a wall 56 of the tub 24, in an embodiment. The linkage assembly 44 may additionally guide movement of the closure panel 16 toward the third position P3. Each linkage 58 of the lineage assembly 44 may move, pivot, and/or otherwise adjust itself relative to the other linkages 58 to accommodate the sliding movement of the closure panel 16.

In another embodiment, the actuating assembly 40 is an electrically powered system for moving the closure panel 16. For example, the actuating assembly 40 could include an electric motor, track, cable, gearing, or any combination of these components for electrically powering the movement of the closure panel 16.

Figure 7:
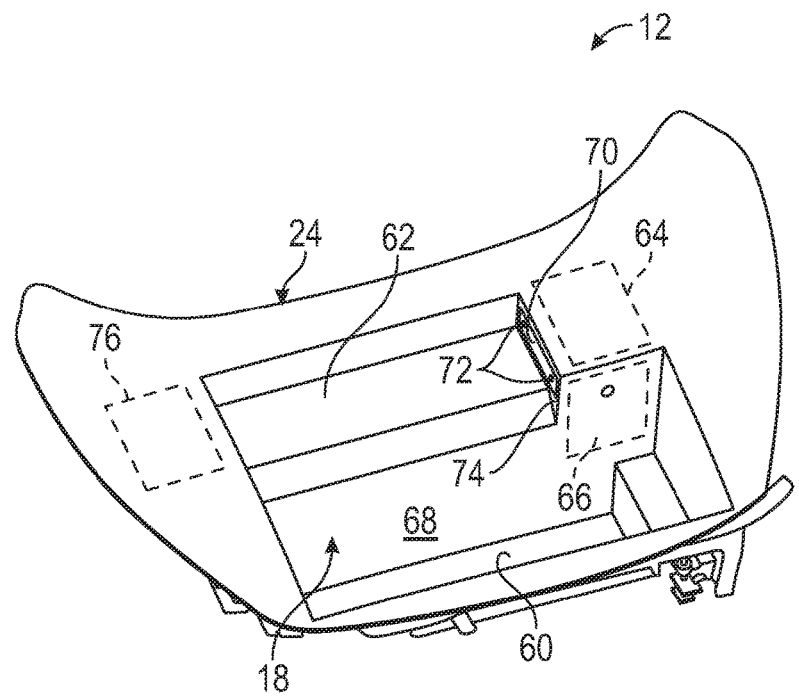
FIG. 7 illustrates a tub of the vehicle compartment system of FIG. 4.

FIG. 7 illustrates the tub 24 of the compartment system 12. The closure panel 16 has been removed from FIG. 7 to better illustrate the various features of the tub 24.

The tub 24 is sized and shaped to establish the storage compartment 18 of the compartment system 12. In an embodiment, the storage compartment 18 includes a cargo area 60 and a rear shelf 62. The cargo area 60 is recessed into the tub 24 to provide a space that can be used for general storage purposes or to hold additional vehicle equipment. In an embodiment, the cargo area 60 is positioned toward the front of the tub 24. In another embodiment, the cargo area 60 is generally rectangular in shape and is sized to accommodate a piece of carry-on luggage. However, the size and shape of the cargo area 60 are not intended to limit this disclosure.

The rear shelf 62 is positioned rearward of the cargo area 60 for establishing a space for holding smaller cargo or vehicle equipment. For example, the rear shelf 62 can easily receive items that can be pushed in and pulled out of the storage compartment 18. The rear shelf 62 may be at least partially covered by the closure panel 16 when the closure panel 16 is in the third position P3 (see, e.g., FIG. 5).

The tub 24 may also include various features for accessing a battery 64 concealed beneath the tub 24. The battery 64 may be low voltage battery or a high voltage traction battery. In an embodiment, the tub 24 includes a first access panel 66 for accessing the battery 64. The first access panel 66 may be provided on a rear wall 68 of the cargo area 60 which is positioned between the cargo area 60 and the rear shelf 62. Other locations are also contemplated within the scope of this disclosure. The first access panel 66 may be opened or removed to allow the battery 64 to be slid forward and then serviced without removing the battery 64 from the vehicle 10.

In another embodiment, the tub 24 includes a second access panel 70 for accessing terminals 72 of the battery 64. The second access panel 70 may be provided on a side wall 74 of the rear shelf 62 and may be opened or removed to access the terminals 72. Other locations are also contemplated within the scope of this disclosure.

In yet another embodiment, the tub 24 could include a third access panel 76 to facilitate servicing another vehicle component. For example, the third access panel 76 could be opened or removed to access a fluid container stored under the tub 24.

Figure 8:
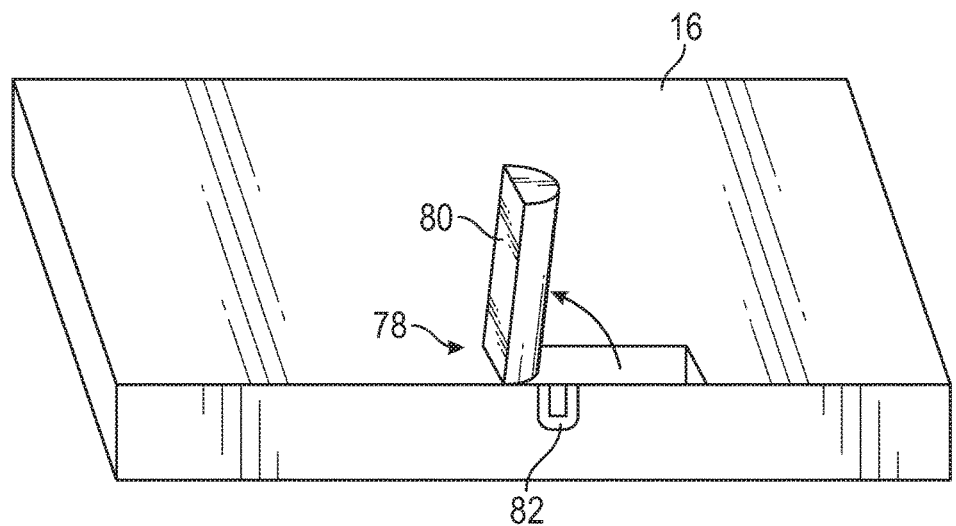
FIG. 8 illustrates a handle of the vehicle compartment system of FIG. 4.

FIG. 8 illustrates a handle 78 that can be provided on the closure panel 16 of the compartment system 12. In an embodiment, the handle 78 is a molded-in feature of the closure panel 16. The handle 78 can be used to move the closure panel 16 from the third position P3 back to the first position P1. In an embodiment, the handle 78 includes a pop-up portion 80 that may be rotated from a stowed position in which it is flush with the closure panel 16 and an active position in which the pop-up portion 80 may be grasped by the user.

The handle 78 may additionally include a loop portion 82 that may be grasped by the user. The user may pull one or both of the pop-up portion 80 and the loop portion 82 to pull the closure panel 16 back to the closed position shown in FIG. 1.

Figure 9A:
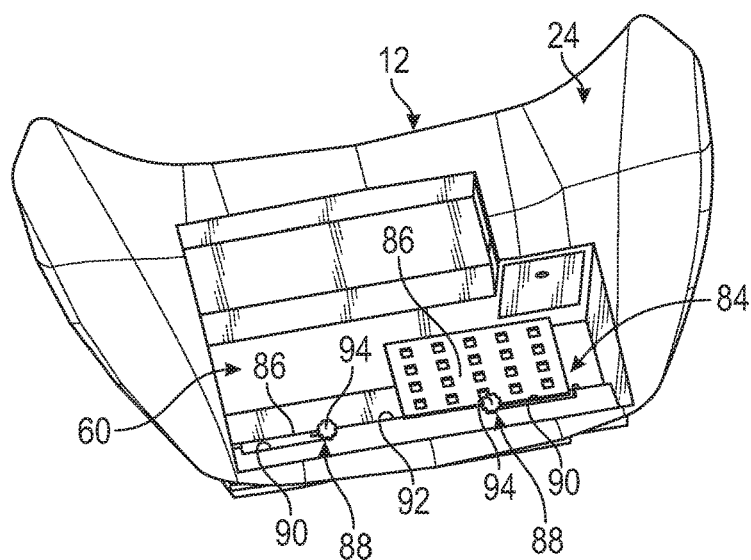
FIGS. 9A and 9B illustrate a shelving system of the vehicle compartment system of FIG. 4.
Figure 9B:
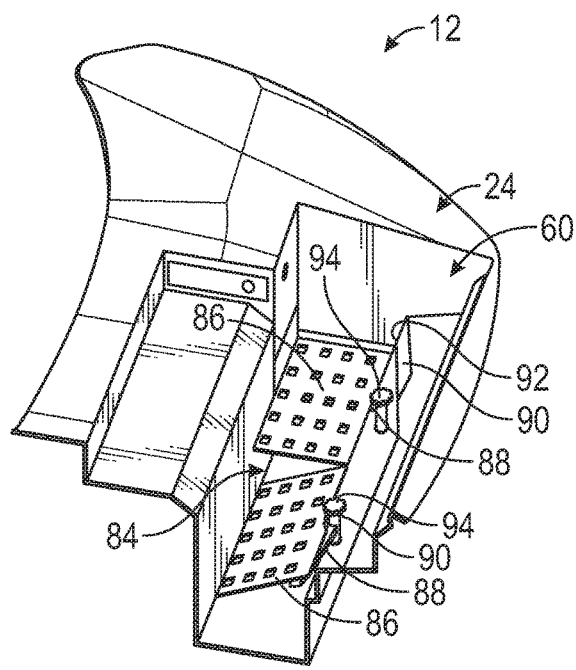

FIGS. 9A and 9B illustrate a shelving system 84 that can be provided for enhancing the usability of the compartment system 12. The shelving system 84 may include one or more shelves 86 that are secured to the tub 24 via bracket assemblies 88. In an embodiment, the bracket assemblies 88 are movably secured within slots 90 formed in a front wall 92 of the cargo area 60 to position the shelves 86 as desired within the cargo area 60. For example, the shelves 86 may be raised, lowered, or moved from side to side by moving the bracket assemblies 88 within the slots 90.

Each bracket assembly 88 may include a locking knob 94. The locking knob 94 may be twisted for locking the positioning of the shelves 86 once a desired shelving position has been selected, and may be twisted in an opposite direction to unlock the positioning of the shelves 86. In another embodiment, the locking knob 94 and integral shelf support may be rotated 90 degrees to lift the shelf 86 from a vertical, stowed position to a horizontal, deployed position.

The vehicle compartment systems of this disclosure provide functional storage capabilities while maintaining closure panels at a level that is below the vehicle down vision line when opened. The exemplary compartments systems reduce weight and high costs associated with conventional hood latching systems, and may increase customer satisfaction by being easily reachable and accessible compared to the conventional hood latching systems.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
a vehicle compartment system that is part of a front end module of the vehicle, wherein the vehicle compartment system includes:
a tub establishing a storage compartment; and
a closure panel movable between a closed position and an open position for accessing the storage compartment,
wherein the closure panel is at least partially above an upper exterior surface of the tub and is maintained below a vehicle down vision line in the open position,
wherein the closure panel is flush with the upper exterior surface in the closed position.

2. The vehicle as recited in claim 1, wherein the vehicle compartment system includes an actuating assembly for moving the closure panel between the closed position and the open position.

3. The vehicle as recited in claim 2, wherein the actuating assembly includes a strut and a linkage assembly that guide movement of the closure panel after unlatching the closure panel relative to the tub.

4. The vehicle as recited in claim 1, wherein the storage compartment includes a cargo area and a rear shelf.

5. The vehicle as recited in claim 4, wherein the rear shelf is at least partially covered by the closure panel when the closure panel is in the open position.

6. The vehicle as recited in claim 1, wherein the vehicle compartment system includes a handle for moving the closure panel from the open position back to the closed position.

7. The vehicle as recited in claim 1, wherein the vehicle compartment system includes a shelving assembly attachable to the tub.

8. The vehicle as recited in claim 7, wherein the shelving assembly includes a shelf and a bracket assembly for securing the shelf to the tub.

9. A vehicle compartment system, comprising:
a tub establishing a storage compartment; and
a closure panel movable between a closed position and an open position for accessing the storage compartment, wherein the closure panel is maintained below a vehicle down vision line in the open position,
wherein the tub includes a first access panel for accessing a battery.

10. The vehicle compartment system as recited in claim 9, comprising a second access panel for accessing a battery terminal.

11. The vehicle as recited in claim 1, wherein the vehicle compartment system is supported by a support beam.

12. The vehicle as recited in claim 11, wherein a front lip of the tub is received over the support beam to support the tub relative to a front end module of the vehicle.

13. The vehicle as recited in claim 11, wherein the support beam further supports a cooling pack of the vehicle.

14. A method, comprising:
raising a closure panel of a vehicle compartment system from a first position to a second position above a storage compartment; and
automatically sliding the closure panel from the second position to a third position rearward of the second position, wherein the closure panel is below a vehicle down vision line and above an outer surface of a hood of the vehicle in the third position.

15. The method as recited in claim 14, comprising:
unlatching the closure panel relative to a tub of the vehicle compartment system prior to raising the closure panel.

16. The method as recited in claim 14, wherein raising the closure panel includes actuating a strut of an actuating assembly.

17. The method as recited in claim 14, wherein automatically sliding the closure panel includes manipulating a strut and a linkage assembly of the vehicle compartment assembly.

18. A method, comprising:
raising a closure panel of a vehicle compartment system from a first position to a second position above a storage compartment;
automatically sliding the closure panel from the second position to a third position rearward of the second position, wherein the closure panel is below a vehicle down vision line in the third position; and
after automatically sliding the closure panel to the third position, opening or removing an access panel of the vehicle compartment system to service a battery.

* * * * *